July 17, 1956     M. R. RICHMOND     2,755,338
ELECTRONIC COMMUTATION SYSTEM
Filed March 5, 1952     5 Sheets-Sheet 2
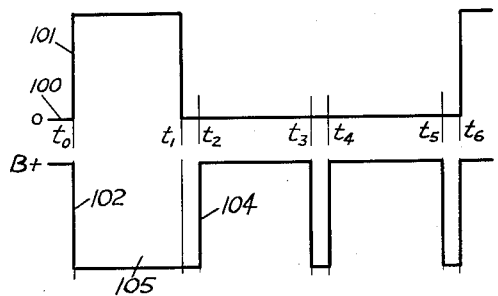
FIG. 2a
FIG. 2b
FIG. 2c
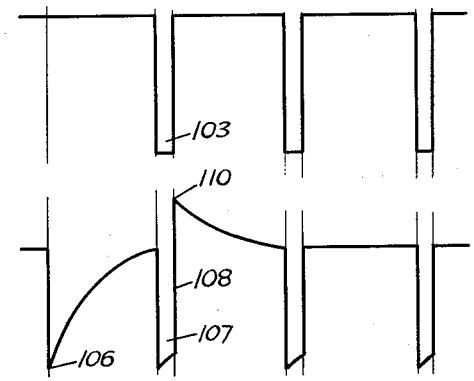
FIG. 2d
FIG. 2e
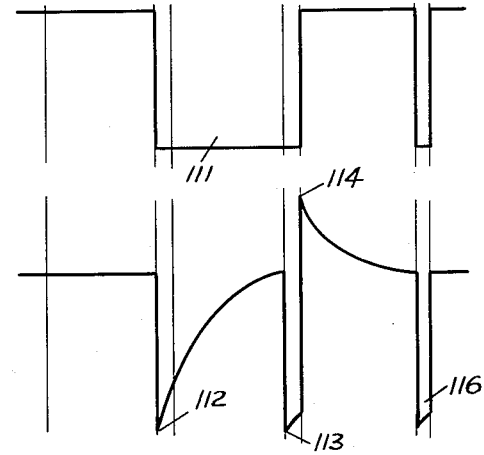
FIG. 2f
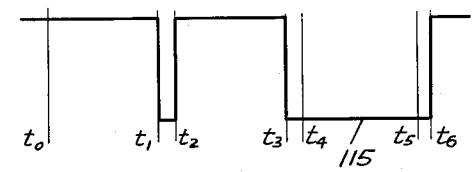
FIG. 2g
INVENTOR
MARTIN R. RICHMOND
BY Elmer J. Gorn
ATTORNEY July 17, 1956  M. R. RICHMOND  2,755,338
ELECTRONIC COMMUTATION SYSTEM
Filed March 5, 1952  5 Sheets-Sheet 3
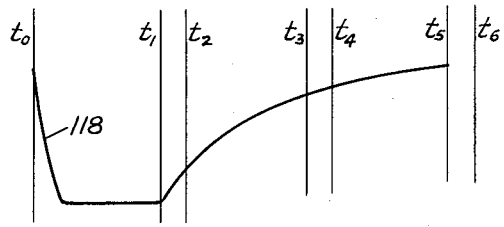
FIG. 2h
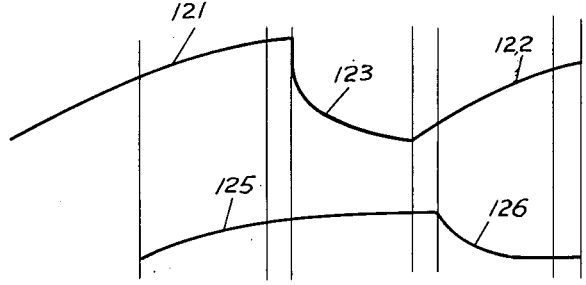
FIG. 2i
FIG. 2j
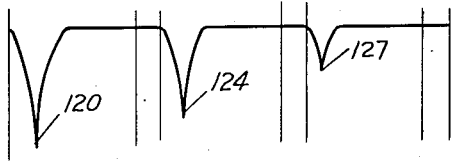
FIG. 2k
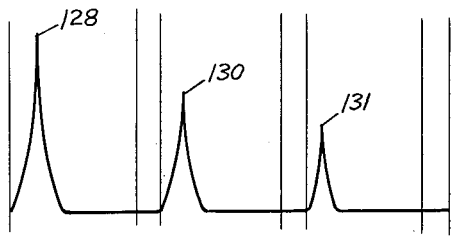
FIG. 2l
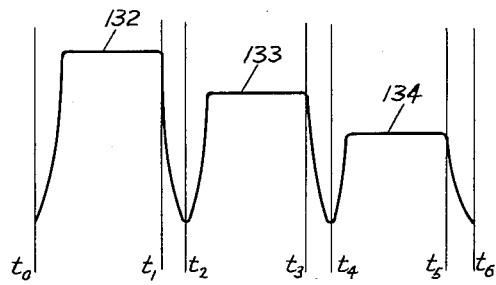
FIG. 2m
INVENTOR
MARTIN R. RICHMOND
BY
ATTORNEY

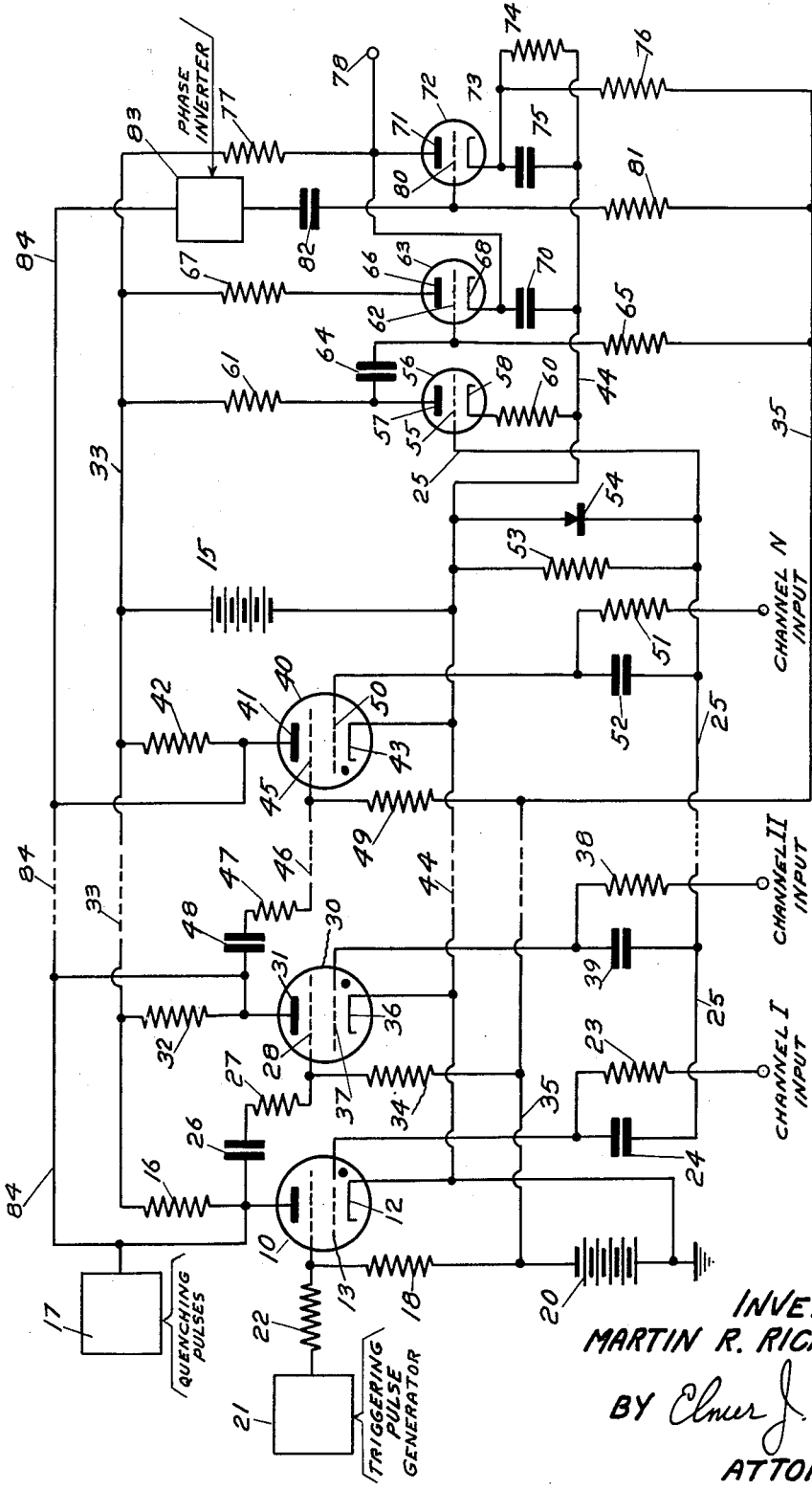

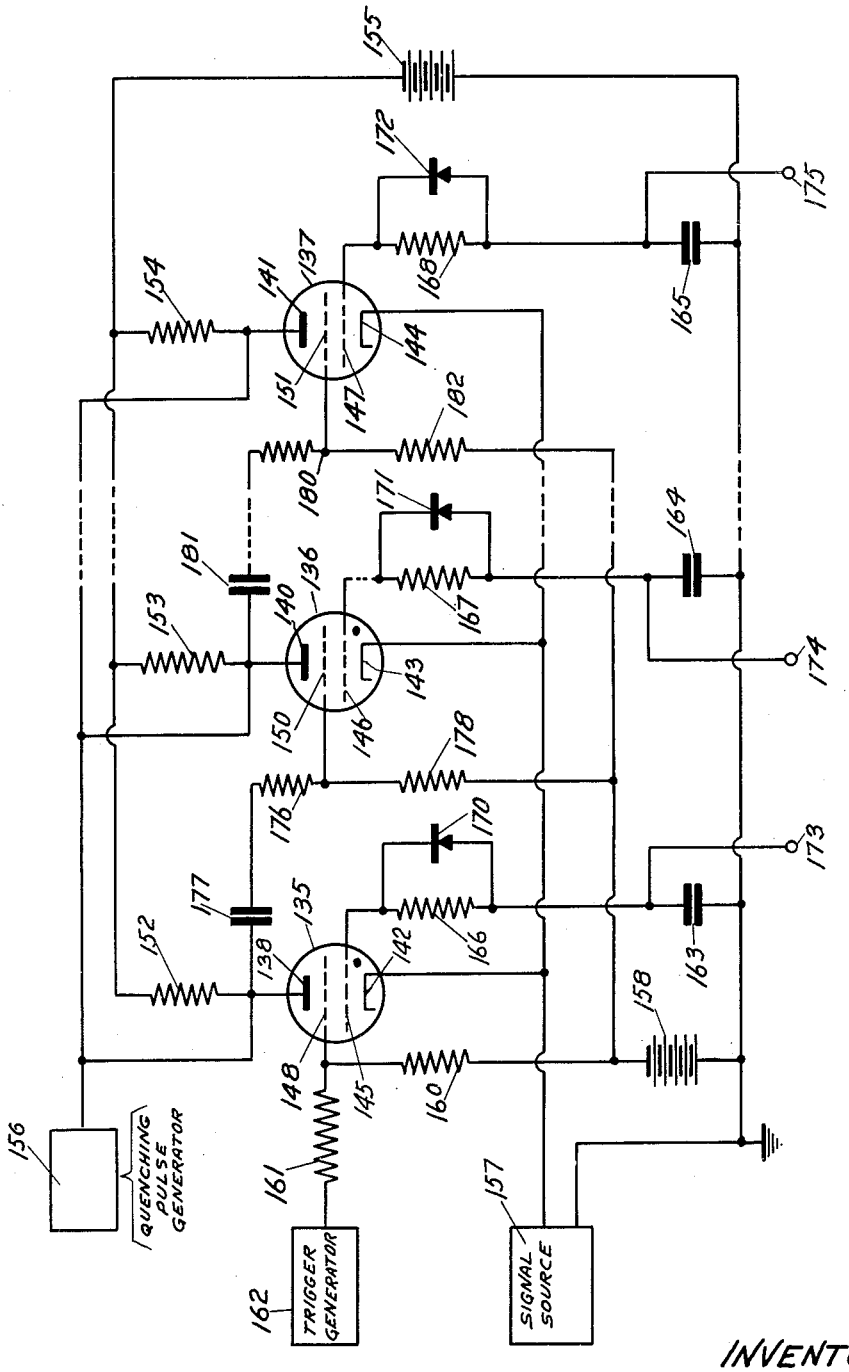

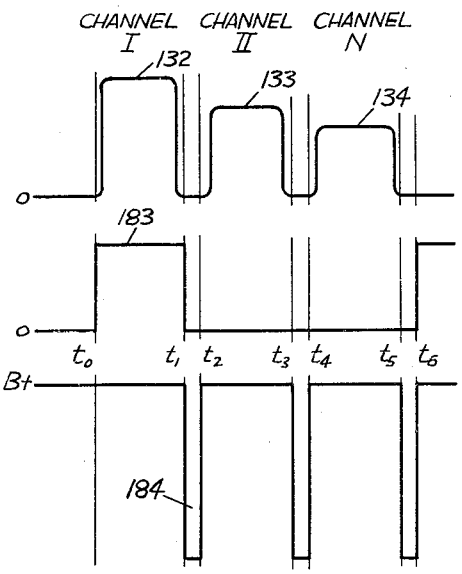
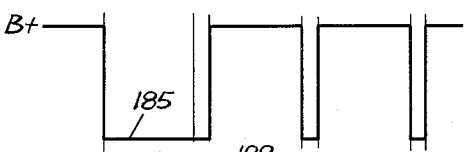
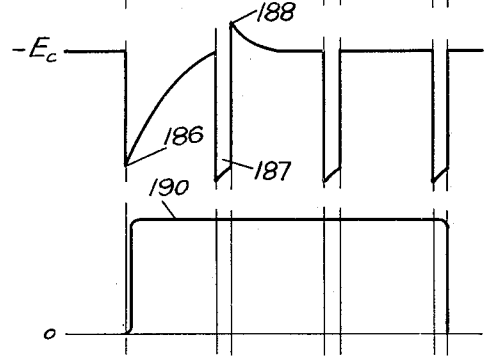
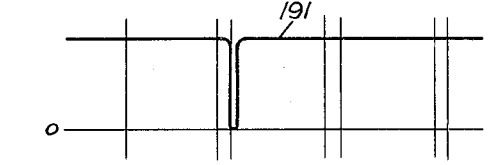
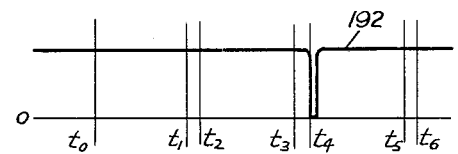

United States Patent Office 2,755,338
Patented July 17, 1956

2,755,338

ELECTRONIC COMMUTATION SYSTEM

Martin R. Richmond, Watertown, Mass., assignor to Raytheon Manufacturing Company, Newton, Mass., a corporation of Delaware Application March 5, 1952, Serial No. 275,002

4 Claims. (Cl. 179—15)

This invention relates to commutating systems of the type utilizing a ring of grid-controlled gaseous discharge tubes, each having a memory capacitor coupled to one of its control grids.

In such circuits use is made of the fact that, when the tube conducts, the first control grid, that is the one closest to the cathode, assumes a potential within about one hundred millivolts of the potential on the cathode. If the potential on the cathode is varied, the potential on the control grid will follow the variations. A series of such tubes is made to conduct in succession at predetermined times for predetermined periods by applying a train of positive triggering pulses to the second control grid of the first tube of the series, and coupling the second control grid of the succeeding tubes in the series to the plate of the preceding tube in the series. Negative pulses are applied to the plates of all the tubes in addition to the regular plate supply to stop conduction at the desired time. In the case of a commutator that samples signals appearing on a plurality of channels, each channel is connected to the first control grid of one of the tubes across a capacitor connected to one end of a common impedance at the input to a pulse-forming circuit. The cathodes are connected to the other end of this impedance. While each tube is non-conducting, the signal voltage from its particular channel charges up the associated capacitor which is discharged through the common impedance when its associated tube conducts. Thus, the signal appearing across the common impedance during the conduction of a tube associated with a particular channel is proportional to the integral of the signal appearing on that channel during the period the associated tube was not conducting. In the receiver a similar circuit sorts out the signals from the various channels. This circuit uses a second series of gaseous discharge tubes. The tubes are arranged to be fired in the same succession, and at the same repetition rate, and for the same conduction period as are the tubes for the commutator circuit described above. In this case, however, the signal received from the commutator is applied to the cathodes of all the tubes in this decommutator circuit. The first control grid of each tube in the series is connected to the associated output circuits for its particular channel across a capacitor. The voltage appearing across this capacitor during the conduction period of the associated tube is proportional to the integral of the signal voltage during this period. The result is a signal in each channel of the output of the decommutator circuit that is a replica of the input signal to each channel of the commutator circuit.

Other and further advantages and features of the invention will become apparent from the following description, reference being had to the drawings wherein:

Fig. 1 is a schematic diagram of the commutator portion of the system of the invention;

Figs. 2a through 2m are time diagrams of the voltage at various points in the circuit of Fig. 1;

Fig. 3 is a schematic diagram of the decommutator portion of the system of the invention; and Fig. 4a through 4h are time diagrams of the voltage at various points in the circuit of Fig. 3.

In Fig. 1, the reference numeral 10 indicates a grid-controlled gaseous discharge tube, such as a thyratron, which has a plate 11, a cathode 12, a first control grid 13, and a second control grid 14. The plate 11 of the tube 10 is connected to a source 15 of positive potential through a resistor 16 and to a source of negative pulses 17. The second control grid 14 is connected to the cathode 12 through a resistor 18 and a source 20 of negative potential. A source 21 of positive triggering pulses is connected to the grid 14 through a resistor 22. The first grid 13 is connected to a source of signal for the first channel through a resistor 23. A capacitor 24 is connected between the grid 13 and a lead 25 common to the other stages of the commutator. The plate 11 of tube 10 is also coupled through a capacitor 26 and a resistor 27 to the second control grid 28 of a second thyratron 30.

The plate 31 of the thyratron 30 is connected through a resistor 32 and over a common line 33 to the source of positive potential 15, and is also connected to the source of quenching pulses 17. The second grid 28 of this thyratron 30 is connected to the source 20 of negative potential through a resistor 34 over a common conductor 35. The cathode 36 of the thyratron 30 is connected to the positive terminal of the potential source 20. The first control grid 37 of this thyratron 30 is connected to a source of signal for channel II through a resistor 38, and is also coupled through a capacitor 39 to the common output conductor 25. There will be a stage, such as thyratrons 10 and 30 and their associated circuitry, for each channel of information desired. In order to simplify the drawings, only three such stages have been shown. The omission of additional stages has been indicated by showing the portions of the conductors common to the several channels, such as conductors 25, 33, and 35, between stages II and N in dotted lines.

The plate 41 of a thyratron 40 is connected to the source 15 of positive potential through a resistor 42. The cathode 43 is connected to the negative terminal of the positive potential source 15 and to the cathodes 12 and 36 over conductor 44. The second control grid 45 is coupled to the plate 31 of the thyratron 30 over a conductor 46 through a resistor 47 and a capacitor 48, and to the source 20 of negative potential over conductor 35 and through a resistor 49. The first control grid 50 is connected to a source of signal for the last channel designated as channel N through a resistor 51, and is coupled to the common output conductor 25 through a capacitor 52. This common output conductor 25 is connected to the conductor 44 through a resistor 53 and a rectifier 54 connected in shunt.

The output conductor 25 is also connected to the grid 55 of a triode 56 having a plate 57 and a cathode 58. The cathode 58 is connected to the conductor 44 through a resistor 60. The plate 57 is connected to the positive supply conductor 33 through resistor 61 and is coupled to the grid 62 of a second triode 63 through a capacitor 64. The grid 62 is also connected to the negative potential conductor 35 through a resistor 65. The triode 63 has a plate 66 connected to the positive supply conductor 33 through a resistor 67 and a cathode 68 coupled to the conductor 44 through a capacitor 70. The cathode 68 is also connected to the plate 71 of a third triode 72. The cathode 73 of the triode 72 is connected to ground through a resistor 74 shunted by a capacitor 75, and is connected through a resistor 76 to the negative potential conductor 35. The plate 71 is also connected to the positive potential conductor 33 through a resistor 77 and to an output terminal 78. The grid 80 is connected to the negative potential conductor 35 through a resistor 81 and to the source of quenching pulses 17 through a capacitor 82 and a phase inverter 83 over line 84.

The operation of the circuit can best be understood with the help of Figs. 2a through 2m. Fig. 2a represents the positive triggering pulses from the source 21 of Fig. 1. The horizontal dimension represents time and the vertical dimension represents magnitude. The voltage is initially zero, as shown by the line 100, until the time $t_0$ when it rises steeply along the line 101. This causes the tube 10 to conduct, dropping the potential of its plate 11 from its normal positive potential to some lower level along the line 102 in Fig. 2b. The plate retains this potential until the time $t_1$ when a negative-going quenching pulse 103, shown in Fig. 2c, arrives at the plate. The tube 10 then ceases to conduct but the potential remains low because of the presence of the quenching pulse 103 until the time $t_2$ when the plate potential is permitted to rise again along the line 104 to the normal operating potential. This negative-going pulse 105 is differentiated by the capacitor 26 and resistors 27 and 34 before being applied to the grid 28 of the tube 30 where it appears in the form of the sharp pulse 106, as shown in Fig. 2d. The quenching pulse 103 also appears at the grid 28 in differentiated form 107, shown in Fig. 2d. At the time $t_2$ when the potential of the plate 11 returns to its normal value, the grid 28 rises in a positive direction along the line 108 to a potential above its normal value represented by the point 110 in Fig. 2d. This positive potential causes the tube 30 to conduct. When this happens, its plate 31 falls to a potential below its normal value represented by a line 111 in Fig. 2e. This negative-going pulse 111 is differentiated in the circuit comprising the capacitor 48 and resistors 47 and 49. This differentiated pulse is applied to the grid 45 of the tube 40 where it appears in the form of the pulse 112 of Fig. 2f, together with a second quenching pulse 112 in differentiated form 113. A positive spike 114 is also generated at the grid 45 similar to the spike 110 shown in Fig. 2d. This positive spike causes the tube 40 to conduct as indicated by the negative pulse 115, shown in Fig. 2g, which appears at the plate 41 and terminates at the time $t_6$ when the third quenching pulse 116 has occurred.

It will be seen from Figs. 2b, 2e, and 2g that tubes 10, 30, and 40 conduct in time intervals $t_0$ to $t_1$ and $t_2$ to $t_3$ and $t_4$ to $t_5$, respectively. During the period an individual tube is not conducting, the signal input from its associated channel is charging its associated capacitor 24, 39 or 52. In the case of tube 10, the capacitor 24 is charging during the interval $t_1$ to $t_6$ along the curve 117 of Fig. 2h. When the tube 10 conducts, its grid 13 is effectively connected to the cathode which is at ground potential, and it discharges through the resistor 53, reducing the voltage across the capacitor along the line 118 of Fig. 2h. This develops a sharp negative pulse across resistor 52 proportional to the integral of the signal on channel I during the period that tube 10 has not been conducting, as shown by the curve 120 in Fig. 2k. Similarly, capacitor 39 is charging to a potential proportional to the value of the signal voltage on channel II during the period that the tube 30 was not conducting, as shown by the curves 121 and 122 of Fig. 2i. When the tube 30 is conducting, the capacitor 39 discharges through the resistor 53, dropping its voltage along the curve 123 of Fig. 2i and developing a sharp negative pulse across the resistor 53 proportional to the integral of the signal on channel II during the non-conducting interval of the tube 30, as shown by the curve 124 in Fig. 2k. Similarly, the capacitor 52 develops a charge proportional to the signal on channel N during the period its associated tube 40 is not conducting, as shown by the curve 125 of Fig. 2j. When the tube 40 conducts, the capacitor 52 discharges through the resistor 53, dropping the potential across the capacitor 52 along the line 126 to produce a sharp negative pulse across the resistor 53, as shown by the curve 127 in Fig. 2k. In this manner a signal in the form of negative pulses 120, 124, and 127 develops across the resistor 53 which represents the information on channels I, II, and N, respectively.

These pulses are applied to the grid 55 of the triode inverter 56 over line 25, and appear as amplified positive pulses 128, 130, and 131, as shown in Fig. 2 (1), at the plate 57 of the triode 56. They are then applied to the grid 62 of the pulse stretcher triode 63 where they charge up the capacitor 70 in the cathode circuit of this tube until the capacitor is discharged through the triode clamp 72 by the application of the quenching pulses 103, 113, and 116, applied to the grid 80 of the triode clamp 72 in inverse polarity after passing through the phase inverter. The signal pulses then appear as the broad pulses 132, 133, and 134, as shown in Fig. 2m. These pulses have an amplitude proportional to the integrated value of the signal in their respective channels during the non-conducting interval of their respective thyratrons. These pulses all have the same duration.

This composite commutated signal can then be used to modulate the carrier of a radio transmitter or can be communicated directly by wire to a decommutator circuit of similar design shown in Fig. 3. The transmitting means are not shown as they may be of any of several well-known types. As in the commutator circuit, there are three gaseous discharge devices 135, 136, and 137, each having a plate 138, 140, or 141, a cathode 142, 143, or 144, a first control grid 145, 146, or 147, and a second control grid 148, 150, and 151. The plates 138, 140, and 141 are each connected through a resistor 152, 153, or 154 to a source of positive potential 155, and directly to a source 156 of negative quenching pulses. The cathodes 142, 143, and 144 are connected to a source of signal potential 157, which may be the terminal 78 of the commutator of Fig. 1 described above, or the signal from a radio frequency carrier modulated with this information. Such a receiving means is not shown as it may be of any of several well-known types. The second control grid 148 of the tube 135 is connected to a source of negative potential 158 through a resistor 160, and is also connected through a resistor 161 to a source 162 of positive triggered pulses, which may be the source 21 of Fig. 1. In any case, the pulses must be of the same repetition rate and duration as those from the source 21. The first control guide 145, 146, or 147 of each tube is coupled to a capacitor 163, 164, or 165 through a resistor 166, 167, or 168, respectively, each shunted by a rectifier 170, 171, or 172. One side of the capacitors 163, 164, and 165 is connected together and to the positive terminal of the potential source 158, and the other side of each is connected to an output terminal 173, 174, or 175. The second control grid 150 of tube 136 is coupled to the plate 138 of tube 135 through a resistor 176 and a capacitor 177. The second control grid 150 is also connected to the source of negative potential 158 through a resistor 178. The second control grid 151 of tube 137 is coupled to the plate 140 of tube 136 through a resistor 180 and a capacitor 181. This grid 151 is also connected to the source of negative potential 158 through a resistor 182. As with Fig. 1, while provision has been made for only three channels, other channels could be added if desired as indicated by the dotted portions of the lines connecting tubes 136 and 137 and their associated circuits.

The operation of this circuit may best be understood by reference to Figs. 4a to 4h. In operation, tubes 135, 136, and 137 are caused to conduct at predetermined times for predetermined periods by means of the trigger pulses from the source 162, and the quenching pulses from the source 156, in much the same manner as were the tubes 10, 30, and 40 of Fig. 1. As each tube conducts, its first control grid 145, 146, or 147 is effectively connected to its associated cathode 142, 143, or 144, as with the commutator of Fig. 1. However, the cathode of each tube in this circuit is at the signal potential, as determined by the source 157, and not at ground potential as in the circuit of Fig. 1. This input signal wave form is shown in Fig. 4a and is seen to be like that shown in Fig. 2n.

As with the commutator circuit of Fig. 1, the tube 135 is caused to conduct by the appearance of a positive pulse 183 at its control grid at the time $t_0$, and is quenched by the appearance of a quenching pulse 184 at its plate 138 at a time $t_1$. This produces a negative pulse 185 at the plate 138 lasting from the time $t_0$ to the time $t_2$. However, the tube is only conducting during the interval $t_0$ to $t_1$. It will be noted that the time $t_0$ is earlier than the beginning of the signal pulse 132, and that the time $t$, is later than the leading edge of the signal pulse 132. This means that the capacitor 163 is brought to zero potential before and after the signal pulse 132. This is facilitated by the rectifier 170 that permits capacitor 163 to charge slowly and discharge rapidly. The rectifiers 171 and 172 perform a similar function for their associated capacitors 164 and 165. The tube 135 is not conducting at the time the other pulses 133 and 134 occur, so that these signal pulses do not appear at the output terminal 173. The negative pulse 185 appears in the differentiated form 186 at the grid 150 of the tube 136, together with the differentiated quenching pulse 187, to generate positive spike 188 at the time $t_2$ to cause the tube 136 to conduct and produce a negative pulse at the plate 140 similar to pulse 183. The pulse is also differentiated and applied to grid 151 of tube 137 at a time $t_2$ and followed by a positive spike similar to spike 188 to cause tube 137 to conduct. The period of conduction of tube 137 is also greater than the duration of the signal pulse 134, and the grid 147 is also returned to ground before and after the signal pulse in order to discharge the capacitor 165 at these times.

The signal in each output terminal, as shown in Figs. 4f, 4g, and 4h, thus represents the integral of the signal over the time the associated tube is conducting. As the conducting period for the tube 135 is coincident with the conducting period of the tube 10 in the commutator circuit in Fig. 1, in such a system the signal pulse 190 appearing at the output terminal 173 will be the channel I information. Similarly, the signal pulse 191 appearing at terminal 174 will be channel II information, and the signal pulse 192 appearing at terminal 175 will be channel N information. Thus, the two circuits taken together sample the signals from several channels, separate them in time for transmission and sort them out at the receiving end according to the time of occurrence to give the input information at the distant point for each channel.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. In an electronic commutator, a plurality of grid-controlled gaseous discharge devices each having a plate, a cathode and first and second control grids, a source of positive potential connected to the plate of each discharge device, a signal source in circuit with the first control grid and cathode of each gaseous discharge device, a capacitor connected between the first control grid and cathode of each said device in shunt with said signal source, means to cause said discharge devices to conduct at predetermined intervals in a predetermined succession for a predetermined time comprising means for applying positive pulses to the second control grid of the first such device in the series, means for coupling the second control grid of each succeeding such device in the series to the plate of the preceding device, and means for applying to the plate of each such device negative pulses of sufficient amplitude to reduce the positive potential on the plate and quench the said devices when conducting.

2. In an electronic commutator, a plurality of grid-controlled gaseous discharge devices each having a plate, a cathode and first and second control grids, a source of positive potential connected to the plate of each discharge device, means to couple a separate signal source to the first control grid of each gaseous discharge device, an impedance, a capacitor connected between the first control grid of each said device and said impedance in shunt with said signal source, and means to cause said discharge devices to conduct at predetermined intervals in a predetermined succession for a predetermined time comprising means for applying positive pulses to the second control grid of the first such device in the series, means for coupling the second control grid of each succeeding such device in the series to the plate of the preceding device, and means for applying to the plate of each such device negative pulses of sufficient amplitude to reduce the positive potential on the plate and quench the said devices when conducting.

3. In an electronic decommutator, a plurality of grid-controlled gaseous discharge devices each having a plate, a cathode and first and second control grids, a source of positive potential connected to the plate of each discharge device, means to connect a common signal source to the cathode of each gaseous discharge device, a capacitor connected in the first control grid-to-cathode circuit of each said device, and means to cause said discharge devices to conduct at predetermined intervals in a predetermined succession for a predetermined time comprising means for applying positive pulses to the second control grid of the first such device in the series, means for coupling the second control grid of each succeeding such device in the series to the plate of the preceding device, and means for applying to the plate of each such device negative pulses of sufficient amplitude to reduce the positive potential on the plate and quench the said devices when conducting.

4. In an electronic commutator system, the combination of an electronic commutator comprising a plurality of grid-controlled gaseous discharge devices each having a plate, a cathode and a control grid, a source of positive potential connected to the plate of each discharge device, means to couple a separate signal source in circuit with the control grid and cathode of each gaseous discharge device, an impedance, a capacitor connected between the control grid of each said device and said impedance in shunt with said signal source, and means to cause said discharge devices to conduct at predetermined intervals in a predetermined succession for a predetermined time; with an electronic decommutator comprising a plurality of grid-controlled gaseous discharge devices each having a plate, a cathode and first and second control grids, a source of positive potential connected to the plate of each discharge device, means to connect a common signal source to the cathode of each gaseous discharge device, a capacitor connected in the first control grid-to-cathode circuit of each said device, and means to cause said discharge devices to conduct at predetermined intervals in a predetermined succession for a predetermined time comprising means for applying positive pulses to the second control grid of the first said device in the series, means for coupling the second control grid of each succeeding such device in the series to the plate of the preceding device, and means for applying to the plate of each such device negative pulses of sufficient amplitude to reduce the positive potential on the plate and quench the said devices when conducting.

References Cited in the file of this patent

UNITED STATES PATENTS

| | | |
|---|---|---|
| 2,508,538 | Posthumus | May 23, 1950 |
| 2,510,060 | Bourns | June 6, 1950 |
| 2,544,683 | Hoeppner et al. | Mar. 13, 1951 |
| 2,554,886 | Stedman et al. | May 29, 1951 |
| 2,558,637 | Walz | June 26, 1951 |